May 24, 1938.  D. W. SHERMAN  2,118,365
AUTOMOBILE FRAME
Filed Aug. 21, 1933
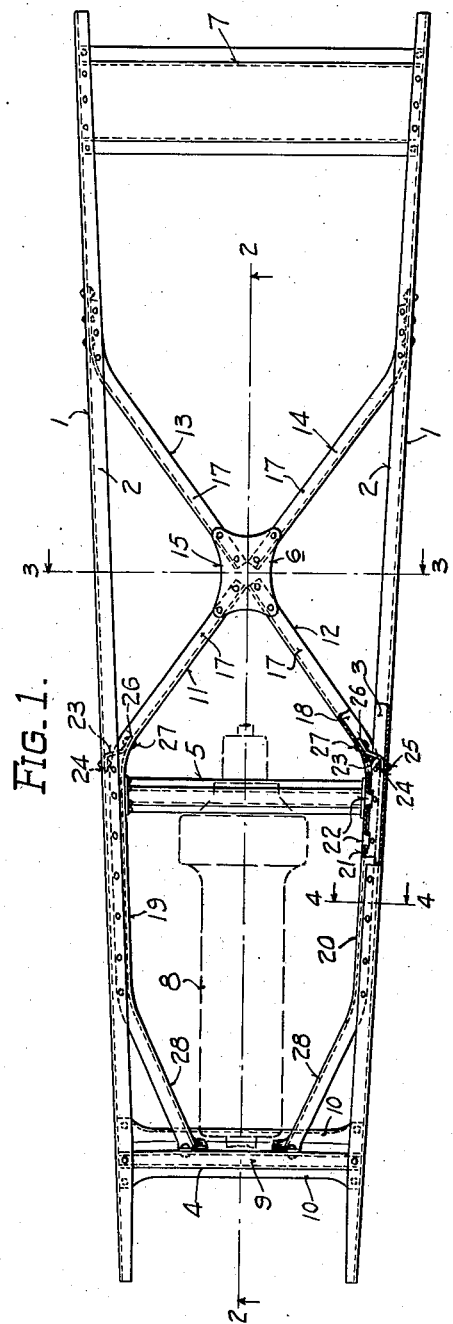
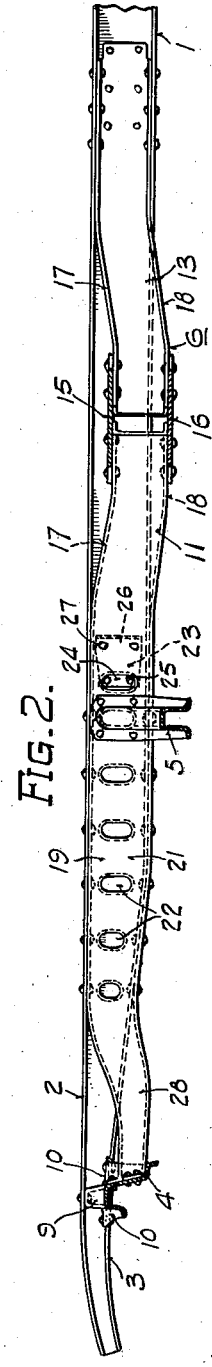
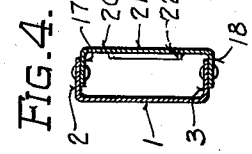
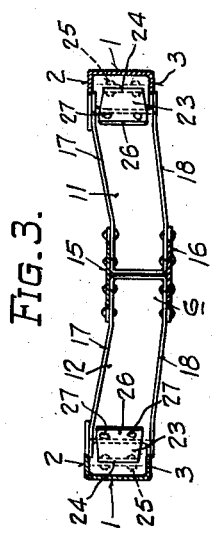
INVENTOR.
Donald W. Sherman
BY
ATTORNEY.

Patented May 24, 1938

2,118,365

UNITED STATES PATENT OFFICE 2,118,365

AUTOMOBILE FRAME

Donald W. Sherman, Milwaukee, Wis., assignor to A. O. Smith Corporation, Milwaukee, Wis., a corporation of New York Application August 21, 1933, Serial No. 686,020

2 Claims. (Cl. 280—106)

This invention relates to an automobile frame and more particularly to one formed principally of sheet metal channel sections and having two opposed channel side rails and a plurality of cross bars.

One of the major problems in designing modern automobiles is the difficulty of eliminating objectionable vibrations and movements which occur when traveling over rough roads and at high speeds and which induce body squeaks and rattles and a fear of lack of stability and safety in the car. These vibrations and movements originate principally at the front wheels and travel back through the frame to the main body of the car.

Experimental tests indicate that the difficulty may be largely overcome by increasing or varying the stiffness of the chassis frame and its resistance to torsional and lateral weaving. In experiments the X-type of cross member has been found to have great resistance to the weaving movements referred to.

However, due to the location of the engine at the forward end of the car, it is necessary to place the X-cross member at the center or rear of the car. Instead of eliminating the undesirable vibrations, this construction tends to localize the movements in the forward end of the car, thereby increasing the frequency of the vibrations at this end and making them more objectionable.

The object of the present invention is to provide a frame employing an X-type of cross member and in which the rigidity of the cross member is transmitted to the forward end of the car, thereby preventing the vibrations from entering into the frame at their source.

Other objects will appear hereinafter.

The invention is illustrated in one embodiment in the accompanying drawing, in which:

Figure 1 is a top plan view of the frame;

Fig. 2 is an enlarged longitudinal section on line 2—2 of Fig. 1;

Fig. 3 is an enlarged transverse section on line 3—3 of Fig. 1; and

Fig. 4 is an enlarged transverse section on line 4—4 of Fig. 1.

The frame comprises, in general, two opposed sheet metal channel side rails 1 extending longitudinally of the frame and each having its flanges 2 and 3 facing inwardly. The side rails 1 are joined by suitable cross members 4, 5, 6, and 7.

The cross bar 4 is of conventional construction and is located at the forward end of the frame to provide strength for supporting the forward end of the engine 8 and the radiator (not shown). As shown, it is constructed of an inverted U-shaped sheet metal member having an upper horizontal web 9 secured at its ends to the upper flanges 2 of the side rails, and having lower side flanges 10 secured at their ends to the lower flanges 3 of the side rails.

The cross bar 5 is located at the rear end of the engine 8 for supporting the same and is of suitable sheet metal channel section as shown. This cross bar may be eliminated, if desired, and the engine mounted on hangers on the side rails or in any other suitable manner.

The cross member 6 is of X-construction and is formed of four diagonal channel-shaped legs 11, 12, 13, and 14. The inner ends of the legs of the member are joined together by any suitable means such as the plates 15 and 16, riveted to their upper and lower flanges 17 and 18, respectively. The outer ends of the legs are joined to the side rails 1 by riveting or welding, as preferred.

The cross bar 7 is at the rear end of the frame and may be of any suitable design. The construction shown is of light channel section secured at its ends to the side rails 1.

In the illustrated embodiment of the present invention, the forward channel-shaped legs 11 and 12 of the X-member have their flanges 17 and 18 facing the side rails, so that the forward ends of the legs engage the side rail channels, as shown, with the upper flanges 17 of the legs engaging the lower surfaces of the upper flanges 2 of the side rails and the lower flanges 18 of the legs engaging the lower surfaces of the lower flanges 3 of the side rails. The flanges of the legs may be arranged above the flanges of the side rails, or any other arrangement may be suitable.

The rear legs 13 and 14 may have their flanges facing in either direction, those illustrated being inward so that the legs fit into the side rails and have their corresponding flanges and side rails riveted together.

The legs 11 and 12 meet the side rail adjacent the ends of the cross bar 5 or near the rear of the engine, and extend forwardly along the side rails forming sub-rails 19 and 20, respectively. The flanges 17 and 18 of the sub-rails are riveted at suitable intervals to the flanges 2 and 3 of the side rails, as shown. The vertical webs 21 of the sub-rails 19 and 20 have suitable openings 22 for the purpose of lightening the weight of the structure and to facilitate access to the inside of the channel members to perform riveting operations. The edges of the metal at the openings are turned laterally to strengthen the web.

The structure of the side rails as reenforced by the sub-rails secured thereto for most of the length of the engine is essentially box-like and of considerable strength. However, the use of the structure in conjunction with the X-member 6 causes a vertical loading of the side rail by the sub-rail and vice versa which establishes relative vertical movement between the two. To overcome this difficulty the present invention provides a tie-brace 23 adjacent the outer ends of each of the forward legs 11 and 12.

These tie-braces 23 are of sheet metal and extend transversely of the frame between each forward leg of the X-member 6 and the adjacent side rail. The tie-braces fit in the rear end of the box-like section and have outer flanges 24 secured by rivets 25 to the vertical webs of the side rails 1 and inner flanges 26 secured by rivets 27 to the vertical webs of the legs 11 and 12.

Where the rear legs 13 and 14 are constructed similar to the forward legs, tie-braces may also be employed for them. However, in the construction illustrated, the vertical webs of the legs 13 and 14 are secured directly to the vertical webs of the side rails 1 and no tie-brace is needed.

The tie-braces 23 transmit the vertical loads in shear from the side rails to the X-member 6 and prevent too great a flexibility of the member with respect to the side rails.

At the forward end of the frame, a very rigid engine mounting is provided by extending the sub-rails 19 and 20 diagonally inward at 28 and connecting the same to the front cross bar 4 intermediate its ends. This connection may be made in any suitable manner, the feature being to obtain a general strengthening against torsional and lateral weaving by the brace effect of the diagonal struts 28 from near the center of the cross bar 4 to the joining of the sub-rails with the side rails. The strength of the cross bar is also materially improved, the stress carrying length of the bar being substantially shortened.

The forward end of the engine may be mounted either on the front cross bar 4 or the diagonal braces 28. The braces 28 are preferably curved downwardly to clear the engine, as shown, and for this purpose the arrangement of the flanges of the sub-rails 19 and 20 beneath the flanges of the side rails as previously described is of particular advantage.

The cost of the frame and its fabrication difficulties are considerably lessened by making the leg 11 of the X-member 6, the sub-rail 19, and one of the braces 28 of an integral channel section, and likewise leg 12, sub-rail 20, and the corresponding brace 28 of an integral channel section, although it is possible to obtain some of the advantages by separate parts making up these elements.

It is understood that instead of riveting the several parts together, as illustrated, they may be joined by welding, if desired.

Various modifications of the invention may be employed within the scope of the accompanying claims.

I claim:

1. In an automobile frame, two opposed sheet metal channel-shaped side rails extending longitudinally of the frame, a plurality of cross bars connecting said side rails transversely of the frame, a channel-shaped sub-rail extending parallel to each side rail for a predetermined distance and having its flanges facing the corresponding flanges of the side rail and secured thereto to prevent vibration and lateral weaving of the side rails, the flanges of the sub-rails being disposed beneath the flanges of the side rails, and one end of each sub-rail being curved downwardly below the plane of the side rails and inwardly for attachment to a cross bar.

2. In an automobile frame, two opposed sheet metal channel-shaped side rails extending longitudinally of the frame, a plurality of cross bars connecting said side rails transversely of the frame, a channel-shaped sub-rail extending parallel to each side rail for a predetermined distance and having its flanges facing the corresponding flanges of the side rail and secured thereto to prevent vibration and lateral weaving of the side rails, the flanges of the sub-rails being disposed adjacent the flanges of the side rails, and one end of each sub-rail being curved downwardly below the plane of the side rails and inwardly for attachment to a cross bar.

DONALD W. SHERMAN.